US012709830B1

(12) United States Patent
Bagley et al.

(10) Patent No.: US 12,709,830 B1
(45) Date of Patent: Aug. 18, 2026

(54) IMAGE TO PATTERN ENHANCEMENT SYSTEM

(71) Applicant: Gracewood Management, Inc., West Jordan, UT (US)

(72) Inventors: Jim Bagley, West Jordan, UT (US); Brad Critchfield, West Jordan, UT (US); Sam Bagley, West Jordan, UT (US); Justice Daniels, West Jordan, UT (US)

(73) Assignee: GRACEWOOD MANAGEMENT, INC., West Jordan, UT (US)

( * ) Notice: Subject to any disclaimer, the term of this patent is extended or adjusted under 35 U.S.C. 154(b) by 0 days.

(21) Appl. No.: 19/278,361

(22) Filed: Jul. 23, 2025

(51) Int. Cl.

| | |
|---|---|
| ***D05B 11/00*** | (2006.01) |
| ***D05B 19/12*** | (2006.01) |
| ***G06T 5/10*** | (2006.01) |
| ***G06T 5/20*** | (2006.01) |
| ***G06T 7/13*** | (2017.01) |
| ***G06V 10/46*** | (2022.01) |

(52) U.S. Cl.
CPC .............. *D05B 11/00* (2013.01); *D05B 19/12* (2013.01); *G06T 5/10* (2013.01); *G06T 5/20* (2013.01); *G06T 7/13* (2017.01); *G06V 10/473* (2022.01)

(58) Field of Classification Search
CPC ........ D05B 11/00; D05B 19/08; D05B 19/10; D05B 19/12
USPC .......................................................... 700/132
See application file for complete search history.

(56) References Cited

U.S. PATENT DOCUMENTS

| | | | | | |
|---|---|---|---|---|---|
| D273,550 | S * | 4/1984 | Segal | D6/603 | |
| 5,005,499 | A * | 4/1991 | Landoni | D05C 15/20 | 112/117 |
| 6,690,988 | B2 | 2/2004 | Kaymer et al. | | |
| RE38,718 | E | 3/2005 | Futamura | | |
| 7,426,302 | B2 | 9/2008 | Amico et al. | | |
| 10,683,595 | B2 | 6/2020 | Schwarzberger et al. | | |
| 11,473,229 | B1 | 10/2022 | Wolz et al. | | |
| 2003/0074100 | A1* | 4/2003 | Kaymer | D05B 19/08 | 700/138 |
| 2007/0014436 | A1* | 1/2007 | Muto | D05C 5/00 | 382/111 |
| 2008/0113323 | A1* | 5/2008 | McElhoe | G09B 19/003 | 434/258 |
| 2014/0094952 | A1* | 4/2014 | Goldman | D05B 19/08 | 700/138 |
| 2025/0051983 | A1 | 2/2025 | Kongo | | |

FOREIGN PATENT DOCUMENTS

| | | | |
|---|---|---|---|
| JP | H0838756 | A * | 2/1996 |
| JP | H0852291 | A | 2/1996 |

* cited by examiner

*Primary Examiner* — Nathan E Durham
(74) *Attorney, Agent, or Firm* — Robert A. Gerhart; Ryan L. Marshall; Barnes & Thornburg LLP

(57) ABSTRACT

A quilt arrangement engine, a non-transitory, computer-readable medium storing one or more machine-readable instructions that, when executed, cause the one or more processors to perform quilt arrangement engine operations is disclosed. The engine operations include receiving a digital bitmap image and undertaking process steps to generate and store a determined path order as an ordered collection of vector descriptors for quilting.

21 Claims, 7 Drawing Sheets

IMAGE TO PATTERN ENHANCEMENT SYSTEM

TECHNICAL FIELD

The present disclosure relates generally to systems and methods for textile fabrication. More particularly, the disclosure relates to converting bitmap-based pictures into vector-based graphics that are suitable for use as patterns in automated fabrication systems, such as for creating longarm quilting patterns.

BACKGROUND

Traditionally, quilting is a manual craft involving several labor-intensive techniques. The top layer of a quilt is often created through patchwork (or piecing), where small pieces of fabric are sewn together to form a larger design, or through applique, where shapes of fabric are sewn onto a larger background fabric. Once the quilt top is complete, it is layered with batting and a backing fabric. The final step of quilting involves stitching through all three layers to hold them together. This stitching is traditionally done by hand and can be purely functional or can form an intricate decorative pattern in its own right, requiring significant time and artistic skill.

Sewing machines are also used for stitching one or more pieces of fabric with thread. Some sewing machines are stationary such that fabric is fed under a needle of the sewing machine, while other sewing machines, like quilting machines, are maneuverable such that the needle may be moved across the fabric.

The field of quilting has evolved from these traditional methods to include computer-assisted and automated systems. These modern systems often utilize computer-guided components to stitch intricate patterns onto fabric. The instructions for these patterns are contained in digital design files.

In a separate technological domain, digital photography has become ubiquitous, and individuals often capture and store meaningful images in bitmap-based formats, such as JPEG, PNG, or BMP. Unlike the digital design files used by quilting systems, bitmap images are composed of a grid of individual pixels. Due to this major difference in format, a bitmap image cannot be used directly as a pattern file for a typical automated quilting machine.

SUMMARY

In general, this document describes systems and methods for textile fabrication.

In an example embodiment, a quilt-making machine includes a computer-controlled sewing machine, and a quilt arrangement engine comprising one or more processors, and a non-transitory, computer-readable medium storing one or more machine-readable instructions that, when executed, cause the one or more processors to perform quilt arrangement engine operations, the quilt arrangement engine operations that include receiving a digital bitmap image, detecting edges in the digital bitmap image, transforming the detected edges into a collection of vectors, displaying, by a graphical user interface, the collection of vectors as a vector image, receiving, from a user using the graphical user interface, a selection of one or more vectors of the collection of vectors, determining a path order based on the received selection of one or more vectors, and storing, in a non-transitory, computer-readable medium, the determined path order as an ordered collection of vector descriptors.

Various embodiments can include some, all, or none of the following features. Detecting edges in the digital bitmap image can include one or more of performing a gradient-based analysis of the digital bitmap image, performing a second-order derivative analysis of the digital bitmap image, performing canny edge detection to the digital bitmap image, applying a machine learning algorithm to the digital bitmap image, performing wavelet transformation to the digital bitmap image, and applying a fuzzy logic algorithm to the digital bitmap image. The operations can include receiving, from the user using the graphical user interface, a selection of one or more color filters, and filtering the digital bitmap image based on the received selection of one or more color filters. The operations can include receiving, from the user using the graphical user interface, information descriptive of colors of one or more fabrics of a quilting fabric inventory, determining a quilt patch area at least partly defined by one or more of the received selection of one or more vectors, determining, based on the digital bitmap image, a color that is representative of the quilt patch area, identifying, based on the determined color and the received information, a fabric of the quilting fabric inventory having a color that is representative of the determined color, and displaying, by the graphical user interface, information about the determined quilt patch area and the identified fabric. Receiving information descriptive of colors of one or more fabrics of a quilting fabric inventory can include receiving, from the user, one or more digital images of one or more fabrics of the quilting fabric inventory. The operations can include pre-processing the digital bitmap image to enhance edges in the digital bitmap image, where the pre-processing includes one or more of converting the digital bitmap image from a color image to a grayscale image, filtering the digital bitmap image by color, applying a machine learning algorithm, despeckling the digital bitmap image, applying a Fourier transform, applying Gaussian blur, applying a bilateral filter, applying a median filter, applying histogram equalization, adjusting contrast, applying unsharp masking, performing color space conversion, and applying image thresholding. The operations can include filtering the collection of vectors to determine a subset of vectors, where the vector image is based on the determined subset of vectors. The operations can include identifying two or more adjacent vectors of the received selection of one or more vectors, and transforming the identified two or more adjacent vectors into a combined vector. Determining a path order based on the received selection of one or more vectors can include determining a first path-to-path order for the received selection of one or more vectors, where each of the vectors is representative of a machine movement path, determining a first traversal distance between paths in the first path-to-path order, determining a second path-to-path order, different from the first path-to-path order, for the received selection of one or more vectors, determining a second traversal distance between paths in the second path-to-path order, and providing the first path-to-path order as the determined path order based on a determination that the first traversal distance is less than the second traversal distance, or providing the second path-to-path order as the determined path order based on a determination that the second traversal distance is less than the first traversal distance. The quilt-making machine can include a controllable machine, where the operations can include transforming the ordered collection of vector descriptors into an ordered collection of machine control instructions. The quilt-making machine can include a computer-controlled sewing machine, and the operations can include controlling operation of the computer-controlled sewing machine based on the ordered collection of vector descriptors.

In another example embodiment, a computer-implemented method for arranging a quilt includes receiving a digital bitmap image, detecting edges in the digital bitmap image, transforming the detected edges into a collection of vectors, displaying, by a graphical user interface, the collection of vectors as a vector image, receiving, from a user using the graphical user interface, a selection of one or more vectors of the collection of vectors, determining a path order based on the received selection of one or more vectors, and storing, in a non-transitory, computer-readable medium, the determined path order as an ordered collection of vector descriptors.

Various embodiments can include some, all, or none of the following features. Detecting edges in the digital bitmap image can include one or more of performing a gradient-based analysis of the digital bitmap image, performing a second-order derivative analysis of the digital bitmap image, performing canny edge detection to the digital bitmap image, applying a machine learning algorithm to the digital bitmap image, performing wavelet transformation to the digital bitmap image, and applying a fuzzy logic algorithm to the digital bitmap image. The computer-implemented method can include receiving, from the user using the graphical user interface, a selection of one or more color filters, and filtering the digital bitmap image based on the received selection of one or more color filters. The computer-implemented method can include pre-processing the digital bitmap image to enhance edges in the digital bitmap image, where the pre-processing can include one or more of converting the digital bitmap image from a color image to a grayscale image, filtering the digital bitmap image by color, applying a machine learning algorithm, despeckling the digital bitmap image, applying a Fourier transform, applying Gaussian blur, applying a bilateral filter, applying a median filter, applying histogram equalization, adjusting contrast, applying unsharp masking, performing color space conversion, and applying image thresholding. The computer-implemented method can include filtering the collection of vectors to determine a subset of vectors, where the vector image is based on the determined subset of vectors. The computer-implemented method can include identifying two or more adjacent vectors of the received selection of one or more vectors, and transforming the identified two or more adjacent vectors into a combined vector.

Determining a path order based on the received selection of one or more vectors can include determining a first path-to-path order for the received selection of one or more vectors, where each of the vectors is representative of a machine movement path, determining a first traversal distance between paths in the first path-to-path order, determining a second path-to-path order, different from the first path-to-path order, for the received selection of one or more vectors, determining a second traversal distance between paths in the second path-to-path order, and providing the first path-to-path order as the determined path order based on a determination that the first traversal distance is less than the second traversal distance, or providing the second path-to-path order as the determined path order based on a determination that the second traversal distance is less than the first traversal distance. The computer-implemented method can include transforming the ordered collection of vector descriptors into an ordered collection of machine control instructions. The computer-implemented method can include controlling operation of a computer-controlled sewing machine based on the ordered collection of vector descriptors.

In another example embodiment, a quilt is assembled by a computer-implemented method that includes receiving a digital bitmap image, detecting edges in the digital bitmap image, transforming the detected edges into a collection of vectors, displaying, by a graphical user interface, the collection of vectors as a vector image, receiving, from a user using the graphical user interface, a selection of one or more vectors of the collection of vectors, determining a path order based on the received selection of one or more vectors, storing, in a non-transitory, computer-readable medium, the determined path order as an ordered collection of vector descriptors, and controlling operation of a computer-controlled sewing machine based on the ordered collection of vector descriptors.

Various embodiments can include some, all, or none of the following features. Detecting edges in the digital bitmap image can include one or more of performing a gradient-based analysis of the digital bitmap image, performing a second-order derivative analysis of the digital bitmap image, performing canny edge detection to the digital bitmap image, applying a machine learning algorithm to the digital bitmap image, performing wavelet transformation to the digital bitmap image, applying a fuzzy logic algorithm to the digital bitmap image, receiving a user selection of one or more color filters, filtering the digital bitmap image based on the received selection of one or more color filters, converting the digital bitmap image from a color image to a grayscale image, filtering the digital bitmap image by color, applying a machine learning algorithm, despeckling the digital bitmap image, applying a Fourier transform, applying Gaussian blur, applying a bilateral filter, applying a median filter, applying histogram equalization, adjusting contrast, applying unsharp masking, performing color space conversion, applying image thresholding, filtering the collection of vectors to determine a subset of vectors, where the vector image is based on the determined subset of vectors, filtering the collection of vectors to determine a subset of vectors, where the vector image is based on the determined subset of vectors, identifying two or more adjacent vectors of the received selection of one or more vectors, and transforming the identified two or more adjacent vectors into a combined vector, determining a first path-to-path order for the received selection of one or more vectors, where each of the vectors is representative of a machine movement path, determining a first traversal distance between paths in the first path-to-path order, determining a second path-to-path order, different from the first path-to-path order, for the received selection of one or more vectors, determining a second traversal distance between paths in the second path-to-path order, and providing the first path-to-path order as the determined path order based on a determination that the first traversal distance is less than the second traversal distance or providing the second path-to-path order as the determined path order based on a determination that the second traversal distance is less than the first traversal distance.

The systems and techniques described here may provide one or more of the following advantages. First, the system provides a seamless and highly automated workflow for converting a personal digital image into a unique, tangible textile pattern, simplifying a task that is unachievable with traditional quilting and cumbersome with existing machine-aided techniques. Second, the system intelligently interprets the source image to filter out extraneous details and can suggest various artistic styles, making the creation of complex patterns accessible to users of different skill levels. Third, the system generates an optimized fabrication path that improves operational efficiency by reducing material usage, such as thread, minimizing non-productive machine movements, and shortening the total fabrication time. Fourth, by enabling real-time monitoring, the system can create an adaptive fabrication process capable of detecting and correcting errors, leading to higher quality and reliability in the final product.

The details of one or more implementations are set forth in the accompanying drawings and the description below. Other features and advantages will be apparent from the description and drawings, and from the claims.

DETAILED DESCRIPTION

Figure 1:
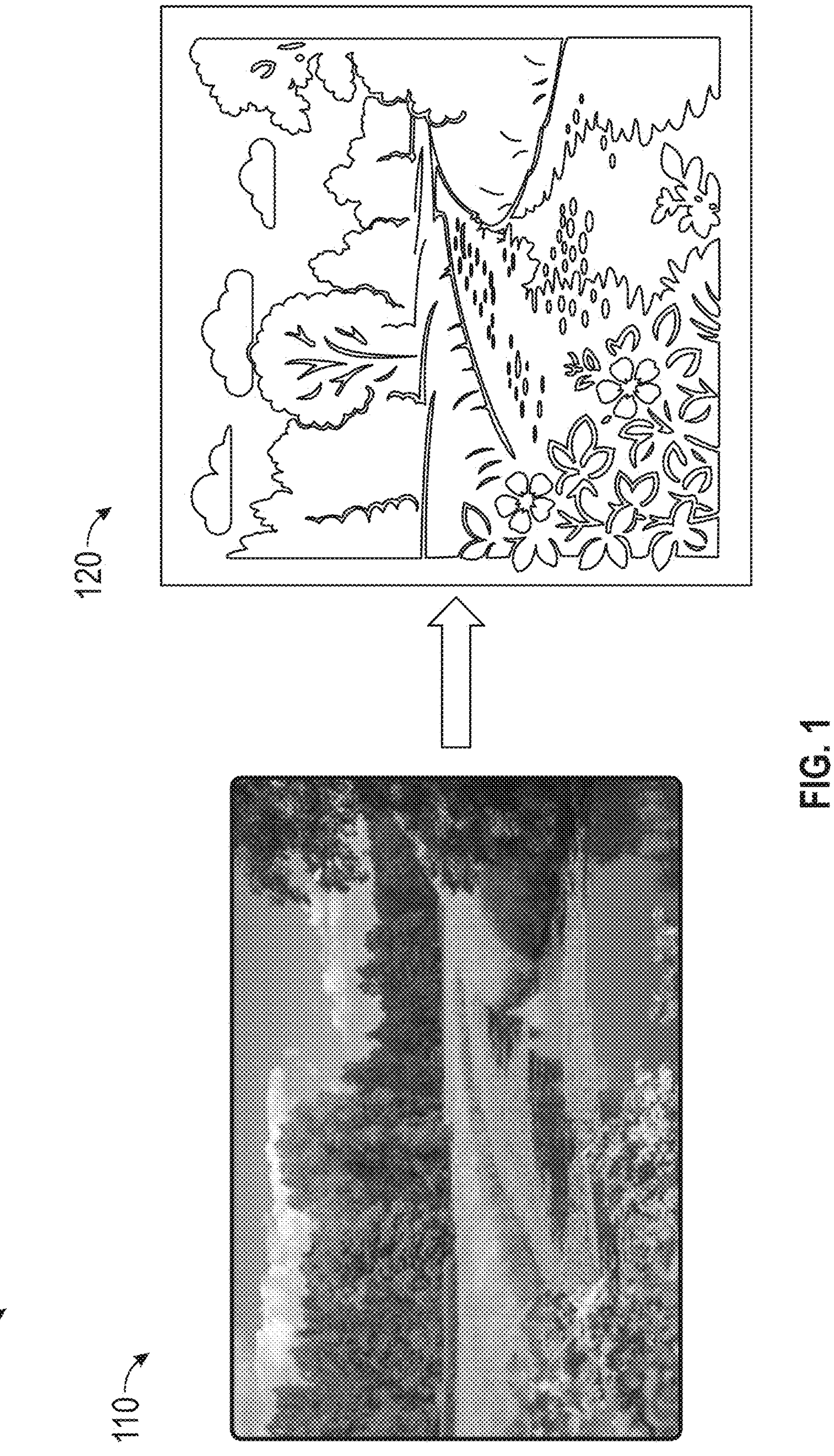
FIG. 1 is a conceptual diagram illustrating an overall process of converting a digital bitmap image into a fabricated textile pattern.

For the purpose of promoting an understanding of the principles of the disclosure, reference will now be made to a number of illustrative embodiments illustrated in the drawings and specific language will be used to describe the same.

This document describes systems and techniques for textile fabrication, and more specifically, for quilting. The present disclosure provides a novel solution to the longstanding challenge of translating personal digital memories, such as photographs, into tangible, stitched works of art using a sewing machine such as a longarm quilting machine. In general, users interact with an automated image-to-quilt fabrication system in which bitmap-based digital images are provided to the system for conversion into vector-based graphics. These graphics are suitable for use as patterns in an automated fabrication system, such as for creating longarm quilting patterns using a longarm sewing machine. The system then controls the automated fabrication system to produce a patterned quilt that serves as an artistic representation of the original digital image, effectively bridging the gap between the digital and textile worlds.

Referring to FIG. 1, a conceptual diagram 100 illustrates the overall transformation of a source digital bitmap image 110 into a final fabricated textile pattern 120. This diagram represents a fundamental media transformation. The source image 110 contains rich, pixel-dense information, including color, brightness, and saturation data for thousands or millions of individual points. The system processes this complex data to generate the tangible, stitched pattern 120, which is a physical interpretation of the image's most salient features, rendered in thread upon a textile medium. The process is not merely a tracing, but an artistic and technical translation from one form of expression to another.

In an example implementation, the disclosed subject matter is embodied as a quilt-making machine, which utilizes longarm quilting components for the fabrication of the textile pattern 120. Longarm quilting is a process in which a sewing machine is used to stitch together the three layers of a quilt (e.g., the quilt top, the batting, and the backing fabric). Unlike traditional machine quilting where the quilter moves the fabric under a stationary sewing machine, longarm quilting involves moving the sewing machine over stationary fabric. The equipment consists of a computer-controlled sewing machine head with a deep throat (the "long arm") mounted on a large frame, typically 10 to 14 feet long. This frame uses a system of rollers to hold the quilt top, batting, and backing fabric layers smooth and taut. The machine head is on a carriage that allows it to glide freely along the frame, enabling the operator, or in this case, a computer control system, to stitch intricate patterns across the entire surface of the quilt with high precision. This method is particularly advantageous as it allows for smooth, continuous stitching over large areas, which is ideal for recreating the flowing lines that are often derived from photographic images.

Figure 2:
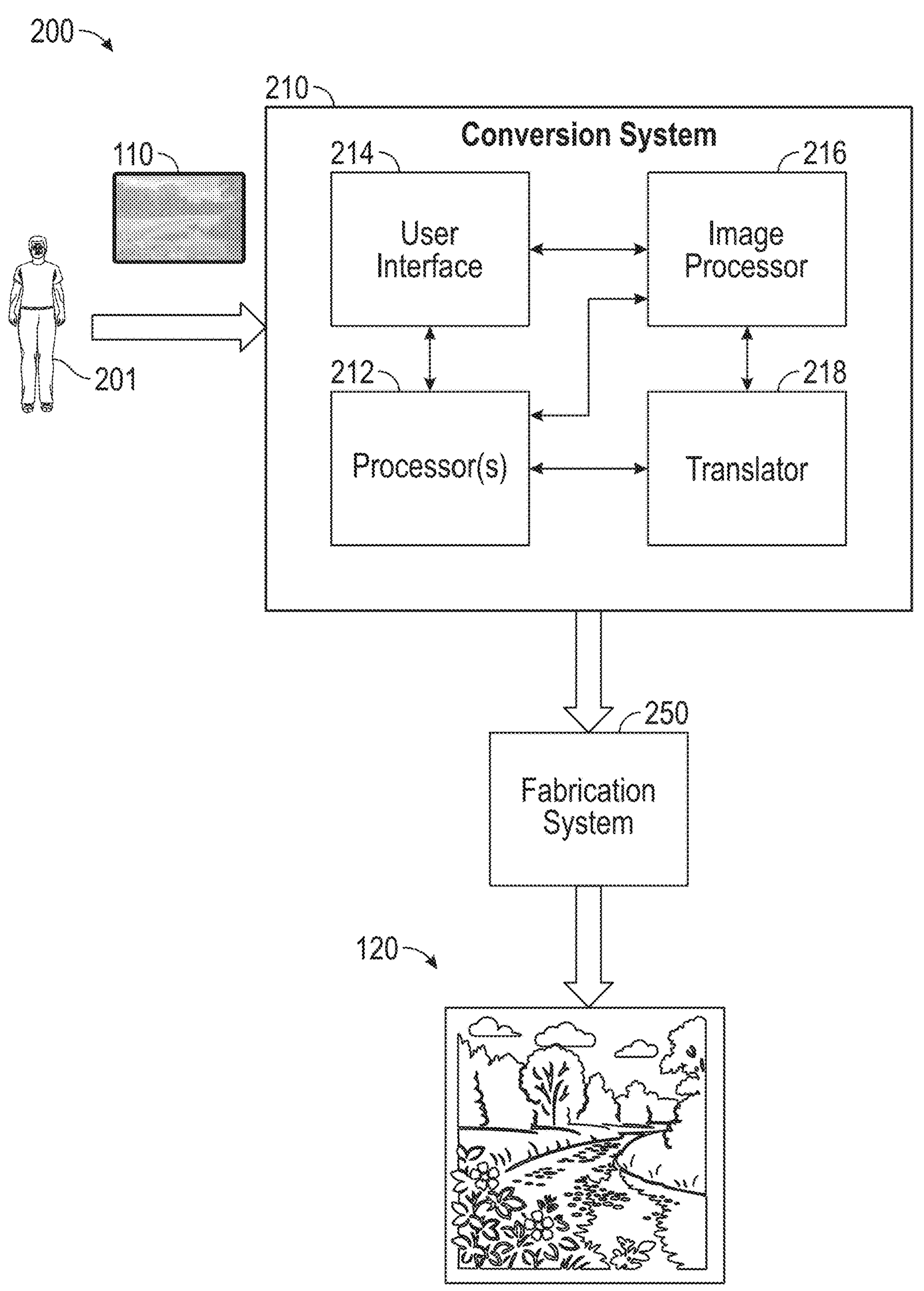
FIG. 2 is a block diagram that shows an example of a system for converting a digital image into a fabricated pattern.

FIG. 2 is a block diagram of an example system 200 for performing this conversion. The system 200 includes a conversion system 210 (e.g., quilt arrangement engine 210), which acts as the digital design studio, and a fabrication system 250, which serves as the automated workshop for producing the final output. The conversion system 210 is a data processing system that, as a whole, is responsible for the complex logic of transforming the digital bitmap image 110 into a precise set of instructions that are usable by the fabrication system 250. The conversion system 210 may be referred to as a quilt arrangement engine.

The conversion system 210 is controlled by one or more processors 212. The processor(s) 212 act as the central control unit for the conversion system 210, executing machine-readable instructions stored in memory (such as a non-transitory, computer-readable medium) to perform quilt arrangement engine operations. The processor(s) 212 orchestrate the overall process, responding to inputs from the user interface 214, directing the image processor 216 to perform specific algorithms, and instructing the translator 218 to generate the final machine code.

Figure 3:
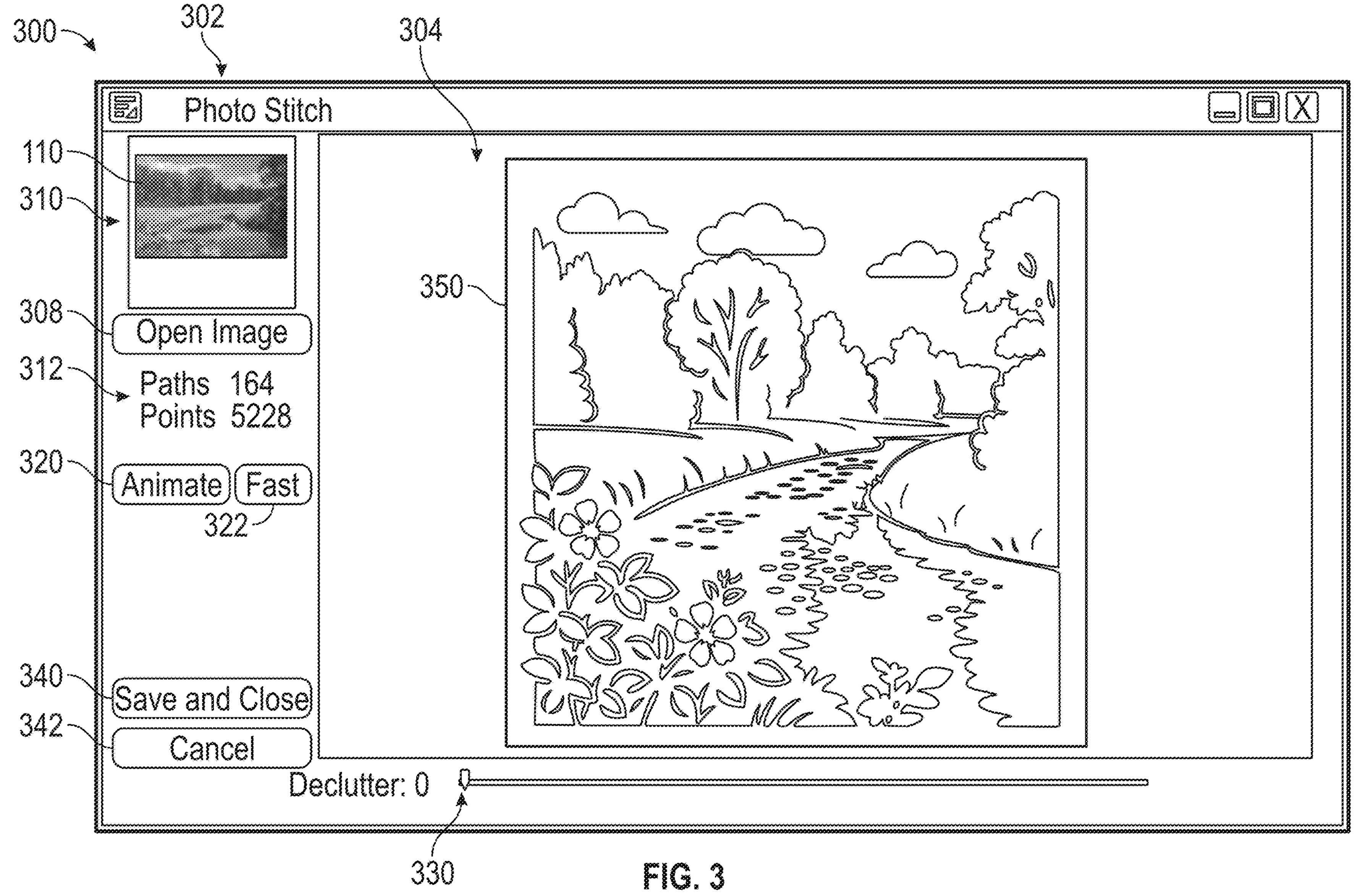
FIG. 3 is an example of a graphical user interface displaying a vector image derived from a digital image.
Figure 4:
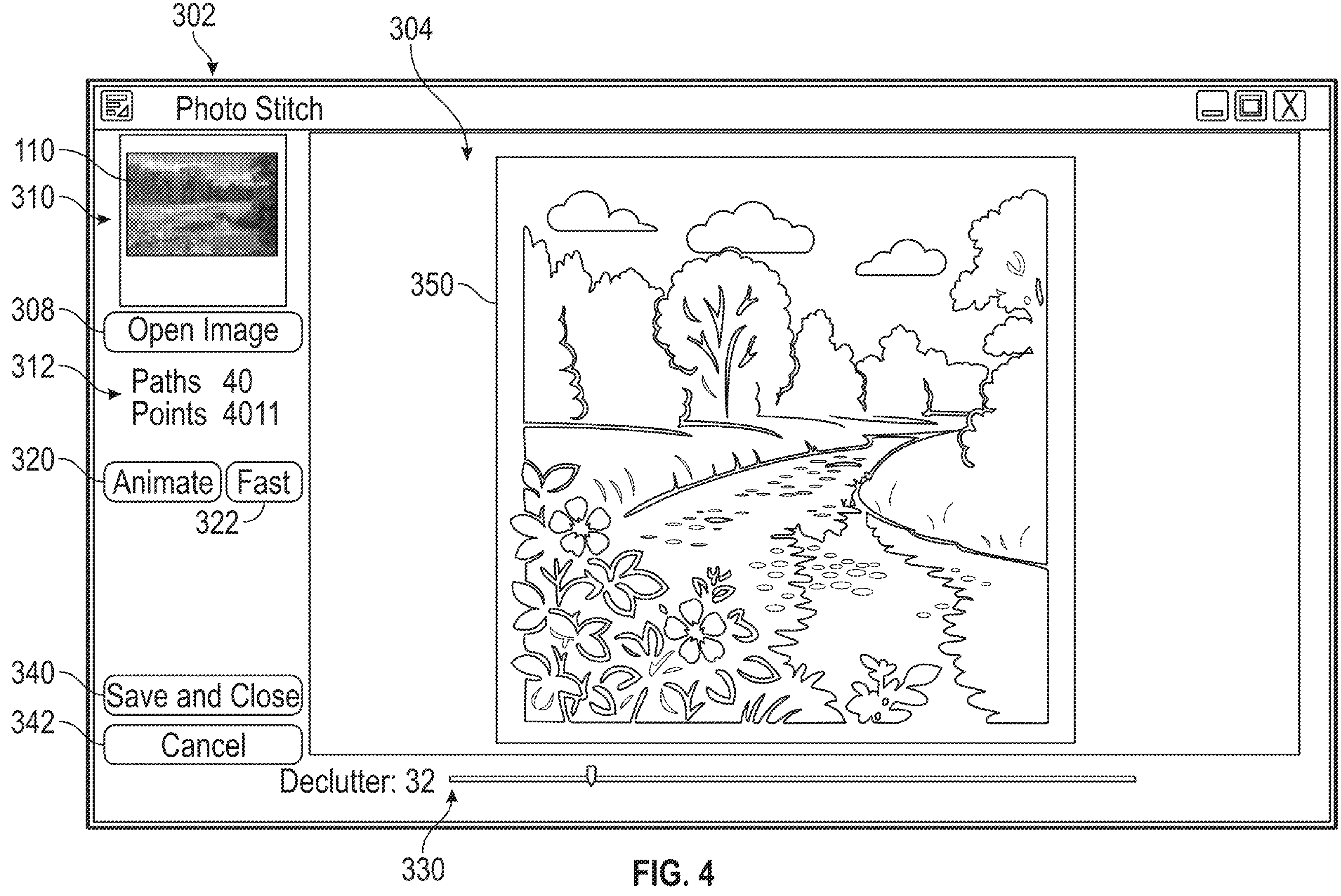
FIG. 4 is an example of the graphical user interface of FIG. 3 after a user has filtered a collection of vectors.
Figure 5:
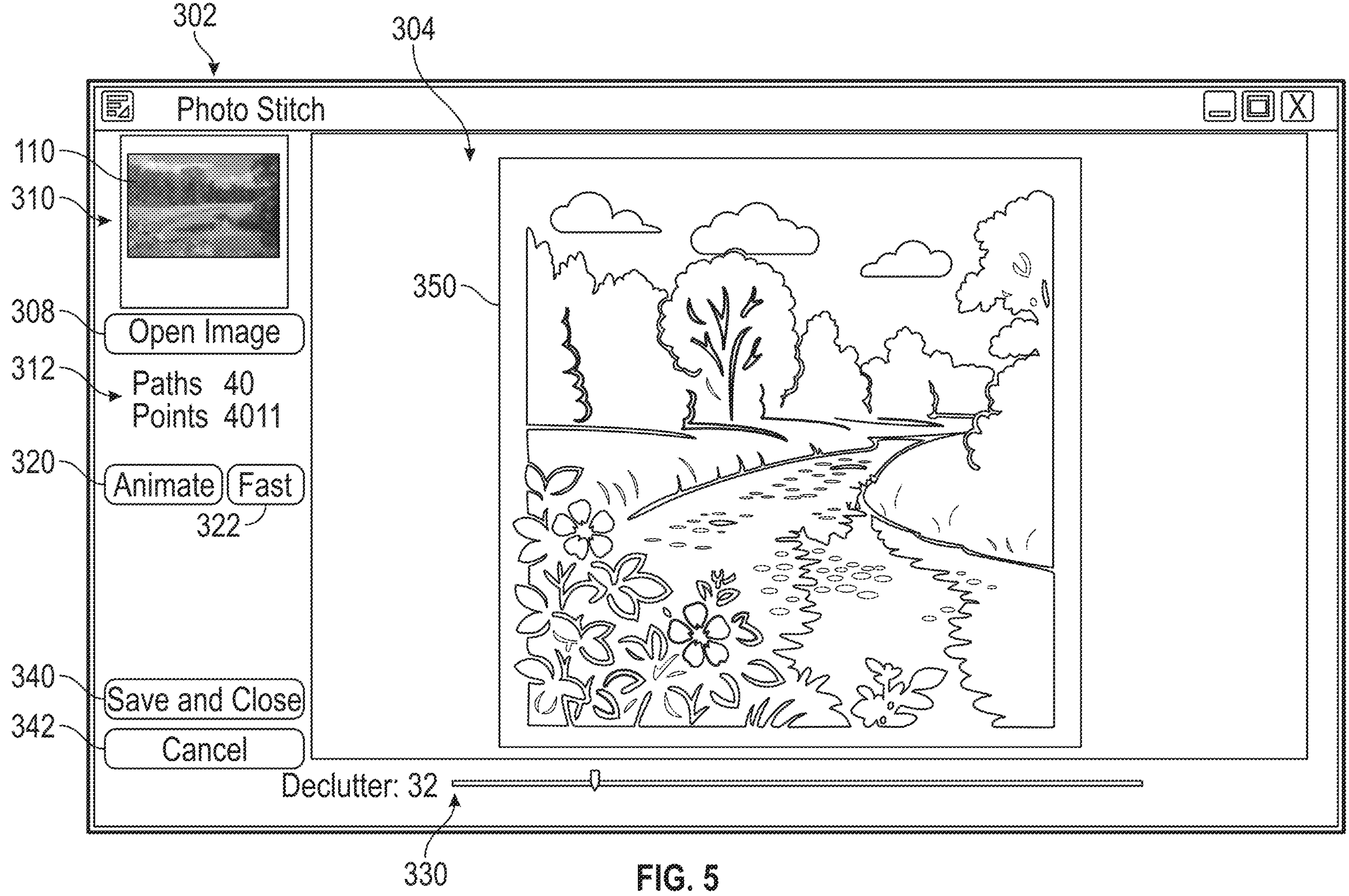
FIG. 5 is an example of the graphical user interface of FIG. 3 showing an animation of a toolpath.

A user 201 interacts with the conversion system 210 via a user interface 214. The user interface 214 is the component that provides for human-computer interaction, allowing a user to guide the technical process. It allows the user to provide the initial digital bitmap image 110, view the results of the automated conversion process, and provide further input to refine the final pattern. As shown in FIGS. 3-5, this can be a graphical user interface (GUI) that displays the vector paths, provides controls for filtering or selecting those paths, and allows the user to preview the fabrication sequence. In some embodiments, the user interface 214 can use other forms of input in addition to or instead of graphical input, such as speech, gestures, gaze tracking, haptics, or combinations of these and any other appropriate forms of user inputs or outputs.

The core conversion logic is executed by the image processor 216. This component performs the complex task of receiving the raw pixel data of the digital bitmap image 110 and transforming it into a structured, vector-based representation. The image processor 216 performs the steps of detecting edges (e.g., shapes with perimeters or boundaries) within the image and transforming those detected edges into a collection of mathematical vectors, forming the artistic foundation of the final pattern.

To prepare the image for accurate edge detection, the image processor 216 may first execute an operation of pre-processing the digital bitmap image to enhance, emphasize, or otherwise distinguish edges in the digital bitmap image. This operation may include one or more of the following techniques. For instance, performing color space conversion can change the image from a standard RGB (red, green, blue) model to a model like LAB or HSV, which separates brightness from color information, allowing for more precise analysis. Often, this is followed by converting the digital bitmap image from a color image to a grayscale image, which simplifies the data to pure luminance values that are ideal for an edge-detection algorithm. To improve the quality of this data, various noise-reduction and enhancement filters can be used. Despeckling is a process that removes small, isolated noise pixels (or specks) that might otherwise be incorrectly identified as features. Broader noise reduction can be achieved by applying a Gaussian blur, which smooths the image by averaging pixel values with their neighbors, or by applying a median filter, which is particularly effective against "salt-and-pepper" noise. For more advanced smoothing that reduces noise while preserving sharp edges, applying a bilateral filter is an effective technique. Another advanced method involves applying a Fourier transform, which converts the image into its frequency components, allowing high-frequency noise to be easily identified and removed. To make the remaining edges more distinct, the system can apply image filtering and/or thresholding (e.g., color, brightness, contrast), adjust contrast to increase the difference between light and dark areas, or apply histogram equalization to automatically redistribute the intensity values for optimal global contrast. Finally, applying unsharp masking can be used to further sharpen and accentuate the fine details along the detected edges before vectorization begins.

Following pre-processing, the image processor 216 performs the edge detection itself. This step may involve several methods, including performing a gradient-based analysis of the image, performing a second-order derivative analysis, or performing canny edge detection. In other embodiments, the system may apply a machine learning algorithm, perform wavelet transformation, or apply a fuzzy logic algorithm to detect edges. The output of this step is a set of pixel-based edge segments.

The final task of the image processor 216 is to transform these pixel-based paths into a structured, ordered collection of mathematical vectors to be used as tool paths. In some embodiments, the image processor 216 can analyze and re-arrange the vectors to better optimize the collection. For example, the image processor 216 can simulate various orderings of the vectors to reduce or minimize tool travel, tool changes, or consumable (e.g., thread) consumption. In some embodiments, the processor may also perform vector simplification. For example, the system may perform the operation of identifying two or more adjacent vectors of the received selection of one or more vectors and transforming the identified two or more adjacent vectors into a combined vector. In some embodiments, the processor may modify one or more of the vectors derived from the image to define connecting paths that are not directly derived from the image, in order to combine two or more disconnects vectors into a single, connected vector path. This process reduces the number of individual vectors, which can improve the smoothness and efficiency of the final toolpath.

Once the user 201 has approved a final set of ordered vector paths, the translator 218 prepares the data for the physical fabrication phase. The translator 218 acts as a post-processor, converting the abstract vector descriptors into a concrete set of machine-specific control instructions. For instance, it can perform the operation of transforming the ordered collection of vector descriptors into an ordered collection of machine control instructions for another controllable machine.

The generated machine control instructions are sent to the fabrication system 250. This system is the physical, electromechanical apparatus that executes the instructions to create the final textile pattern 120. In an exemplary embodiment, the fabrication system 250 is a computer-controlled sewing machine.

FIGS. 3-5 depict a storyboard of a user interacting with an exemplary graphical user interface (GUI) 300, which can be an implementation of the user interface 214. The GUI 300 is divided into an image display area 304 and a collection of user controls 302. The user's workflow begins as shown in FIG. 3. The user interacts with an "Open Image" button 308 to select a digital bitmap image 110. Once an image is selected, a thumbnail 310 of the original image is displayed, and the system automatically performs the initial conversion. A resulting vector image 350 is rendered in the main image display area 304. An information panel 312 provides immediate feedback on the complexity of the conversion, such as the number of vector paths and the total number of points that constitute those paths.

At this point, the user can undertake several actions to refine the initial vector conversion. For instance, the system may perform the operation of receiving, from a user using the graphical user interface, an identification of one or more colors in the digital bitmap image. In response, the system would perform filtering the collection of vectors based on the received identification of one or more colors. This allows the user to isolate specific features of the image for the final pattern. For example, the user may provide a bitmap image of a brown horse standing in a green pasture with a blue sky, and the user may select a "brown" filter in order to quickly separate the horse from the green pasture and blue sky of the image.

In some embodiments, the system can be used not only for creating a stitching pattern but also for planning a patchwork quilt top. In this mode, the system is capable of identifying a quilt patch area of the digital bitmap image, for example, when a user draws a rectangle over a region. The system then performs the step of determining a representative color of the identified quilt patch area. The system then allows for receiving, from the user using the graphical user interface, information descriptive of colors of one or more fabrics of a quilting fabric inventory. For example, the user can provide one or more digital images of the one or more fabrics of the quilting fabric inventory. The system then performs the step of identifying a fabric of the one or more fabrics of the quilting fabric inventory that is a closest match to the determined representative color of the identified quilt patch area. Information about the determined quilt patch area and/or the identified fabric can be displayed to the user.

Next, as illustrated in FIG. 4, the user begins to further refine and curate the generated pattern. The user can manipulate a "Declutter" slider 330. Moving this slider performs the operation of filtering the collection of vectors to determine a subset of vectors, where the vector image is based on the determined subset of vectors. This provides the user with an intuitive, high-level method for reducing visual noise.

Finally, after refining the design, the user can preview the fabrication sequence as shown in FIG. 5. This preview serves as a verification step before the user saves the final vector pattern. For example, the user can inspect the vector image 350 to determine if it includes an appropriate level of detail to meet with the user's approval. The user can also press the "animate" button 320 to observe a graphical representation of the ordering and directions of the paths as they will be stitched. An associated control, such as a "Fast/Slow" toggle 322, may allow the user to adjust the speed of the animation for closer inspection of detailed areas. Once satisfied with the preview, the user can finalize the project by interacting with the "Save and Close" button 340 to store the final vector pattern and close the application, or interact with the "Cancel" button 342 to discard any changes and exit.

Figure 6:
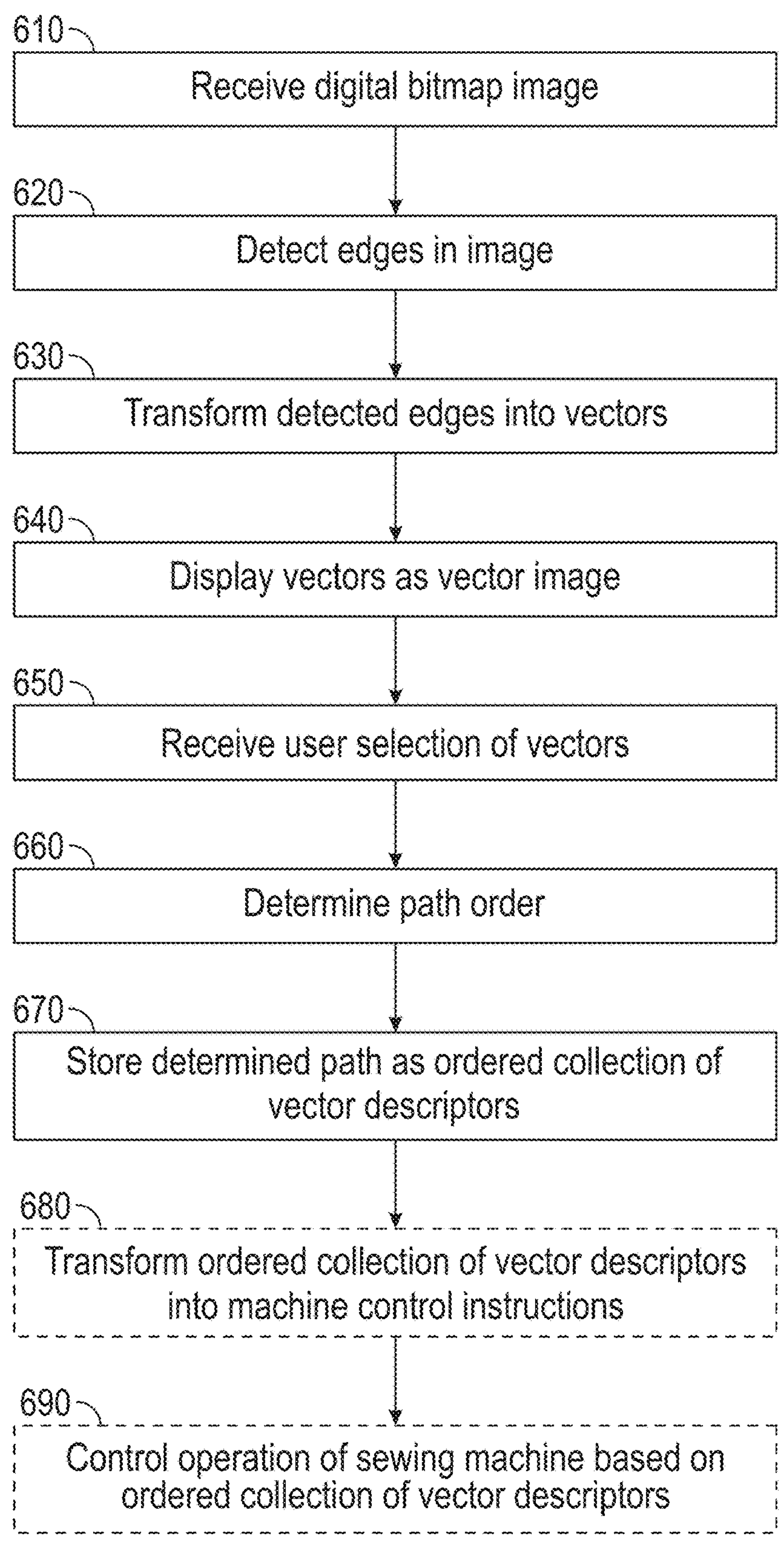
FIG. 6 is a flow chart that shows an example of a process for converting a digital image into a set of machine control instructions.

FIG. 6 is a flow chart that shows an example computer-implemented process (600) for arranging a quilt. The process (600) includes several operations that can be performed by the conversion system 210.

The process begins with receiving a digital bitmap image (610). Next, the system detects edges in the digital bitmap image (620). The detected edges are then transformed into a collection of vectors (630). These vectors are then displayed, by the graphical user interface as a vector image (640). The system then receives, from a user using the graphical user interface, a selection of one or more vectors of the collection of vectors (650).

Based on this refined selection, the system determines a path order based on the received selection of one or more vectors (660). In one embodiment, this step includes several sub-steps. The system determines a first path-to-path order of the received selection of one or more vectors and determines a second path-to-path order of the received selection of one or more vectors, where the second path order is a reverse of the first path order. The system then determines a first traversal distance of the first path order and determines a second traversal distance of the second path order. Finally, the system selects the first path order as the determined path order if the first traversal distance is less than the second traversal distance, and otherwise selects the second path order as the determined path order.

The determined path is then stored in a non-transitory, computer-readable medium, as an ordered collection of vector descriptors (670). This saved file is the final, refined digital blueprint of the pattern. It contains the complete set of finalized vectors, listed in the optimized sequence determined in the previous step. At this stage, the file is a machine-agnostic representation of the design, defining the geometry of the pattern without being tied to any specific fabrication hardware. This allows the pattern to be archived, shared, or later translated for use on multiple different types of machines.

In some embodiments, the process can include transforming the ordered collection of vector descriptors into an ordered collection of machine control instructions (680) for a controllable machine. This is the final translation step, where the translator component 218 converts the generic, ordered vector descriptors into a specific, low-level command language that is precisely understood by the target fabrication system 250. This process involves converting the mathematical descriptions of lines and curves into a sequence of executable commands, such as G-code, that dictates every movement and action of the machine. This includes not just the X and Y coordinates for the toolpath but also commands for tool speed, start/stop signals, and other machine-specific functions.

Finally, the system can control operation of a computer-controlled sewing machine based on the ordered collection of vector descriptors (690). This is the physical execution of the design, where the digital blueprint becomes a tangible object. The fabrication system 250 reads the machine control instructions from the file generated in the previous step and physically manipulates its tool (e.g., a needle and thread) to create the final fabricated textile pattern 120. In an exemplary embodiment where the fabrication system is a computer-controlled longarm quilting machine, the control instructions guide the sewing head with high precision. The final output may be a tangible, physical quilt that is assembled by the computer-implemented process.

In some embodiments, the process (600) can be embodied in a non-transitory computer-readable storage medium storing instructions that, when executed by one or more processors in a quilt arrangement computer system, cause the one or more processors to perform the quilt arrangement operations of the process (600).

Figure 7:
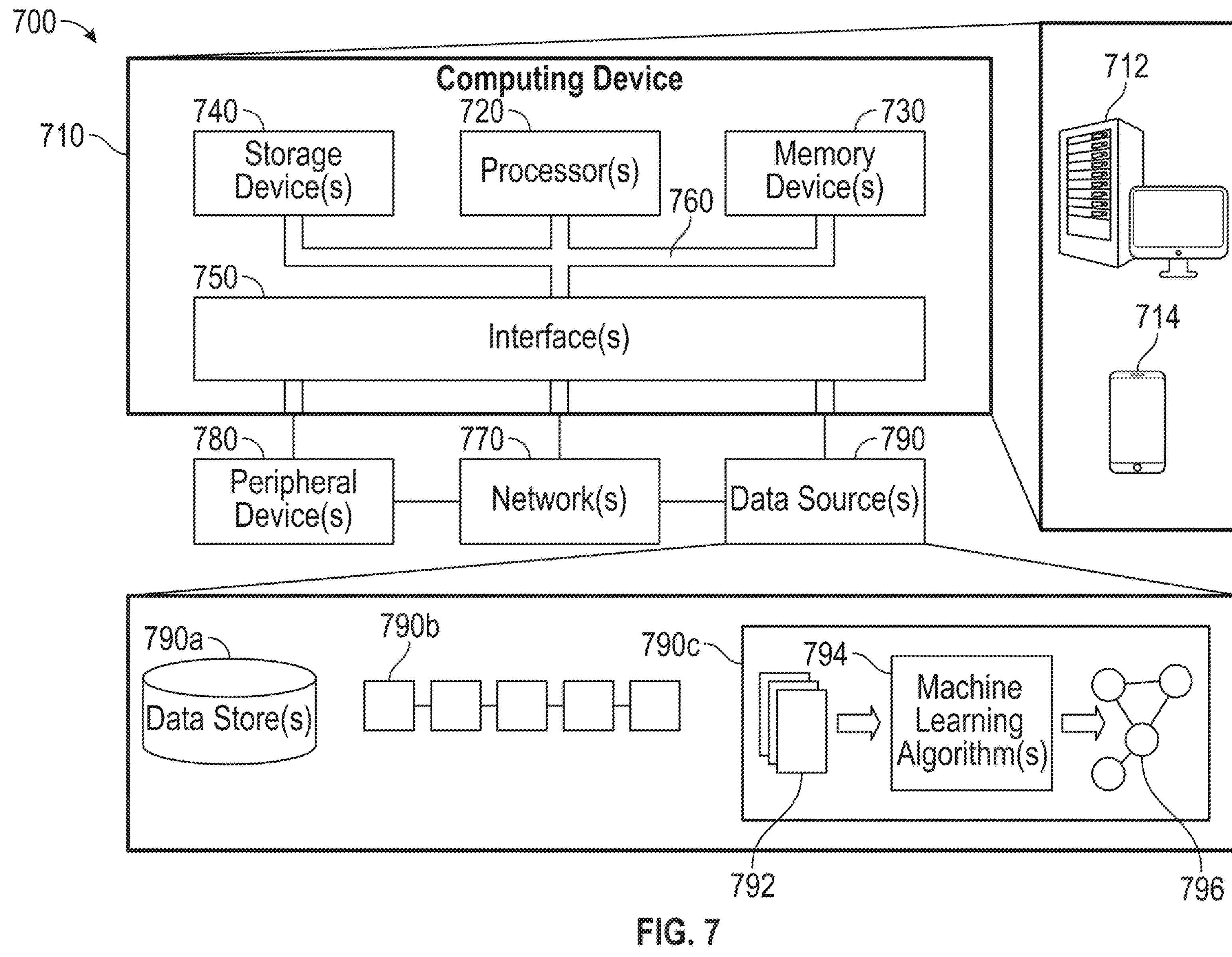
FIG. 7 is a schematic diagram that shows an example of a computing system that can be used to implement the techniques described herein.

FIG. 7 is a schematic diagram that shows an example of a computing system 700 that can be used to implement the techniques described herein. The computing system 700 includes one or more computing devices (e.g., computing device 710), which can be in wired and/or wireless communication with various peripheral device(s) 780, data source(s) 790, and/or other computing devices (e.g., over network(s) 770). The computing device 710 can represent various forms of stationary computers 712 (e.g., workstations, kiosks, servers, mainframes, edge computing devices, quantum computers, etc.) and mobile computers 714 (e.g., laptops, tablets, mobile phones, personal digital assistants, wearable devices, etc.). In some implementations, the computing device 710 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 710, and an entire system can be made up of multiple devices communicating with each other. For example, the computing device 710 can be part of a computing system that includes a network of computing devices, such as a cloud-based computing system, a computing system in an internal network, or a computing system in another sort of shared network. Processors of the computing device (710) and other computing devices of a computing system can be optimized for different types of operations, secure computing tasks, etc. The components shown herein, and their functions, are meant to be examples, and are not meant to limit implementations of the technology described and/or claimed in this document.

The computing device 710 includes processor(s) 720, memory device(s) 730, storage device(s) 740, and interface(s) 750. Each of the processor(s) 720, the memory device(s) 730, the storage device(s) 740, and the interface(s) 750 are interconnected using a system bus 760. The processor(s) 720 are capable of processing instructions for execution within the computing device 710, and can include one or more single-threaded and/or multi-threaded processors. The processor(s) 720 are capable of processing instructions stored in the memory device(s) 730 and/or on the storage device(s) 740. The memory device(s) 730 can store data within the computing device 710, and can include one or more computer-readable media, volatile memory units, and/or non-volatile memory units. The storage device(s) 740 can provide mass storage for the computing device 710, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 750 can include various communications interfaces (e.g., USB, Near-Field Communication (NFC), Bluetooth, WiFi, Ethernet, wireless Ethernet, etc.) that can be coupled to the network(s) 770, peripheral device(s) 780, and/or data source(s) 790 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 750 can include a control interface that receives commands from an input device (e.g., operated by a user) and converts the commands for submission to the processors 720. The interface(s) 750 can include a display interface that includes circuitry for driving a display to present visual information to a user. The interface(s) 750 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 770 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 710 can communicate with the peripheral device(s) 780, the data source(s) 790, and/or other computing devices over the network(s) 770. In some implementations, the computing device 710 can directly communicate with the peripheral device(s) 780, the data source(s), and/or other computing devices.

The peripheral device(s) 780 can provide input/output operations for the computing device 710. Input devices (e.g., keyboards, pointing devices, touchscreens, microphones, cameras, scanners, sensors, etc.) can provide input to the computing device 710 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 710 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 790 can provide data for use by the computing device 710, and/or can maintain data that has been generated by the computing device 710 and/or other devices (e.g., data collected from sensor devices, data aggregated from various different data repositories, etc.). In some implementations, one or more data sources can be hosted by the computing device 710 (e.g., using the storage device(s) 740). In some implementations, one or more data sources can be hosted by a different computing device. Data can be provided by the data source(s) 790 in response to a request for data from the computing device 710 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 790*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 790*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 790*c*. The machine learning system(s) 790*c*, for example, can be used to analyze data from various sources (e.g., data provided by the computing device 710, data from the data store(s) 790*a*, data from the blockchain(s) 790*b*, and/or data from other data sources), to identify patterns in the data, and to draw inferences from the data patterns. In general, training data 792 can be provided to one or more machine learning algorithms 794, and the machine learning algorithm(s) can generate a machine learning model 796. Execution of the machine learning algorithm(s) can be performed by the computing device 710, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A quilt-making machine, comprising:

a computer-controlled sewing machine;

a quilt arrangement engine comprising one or more processors; and a non-transitory, computer-readable medium storing one or more machine-readable instructions that, when executed, cause the one or more processors to perform quilt arrangement engine operations, the quilt arrangement engine operations comprising:

receiving a digital bitmap image;

detecting edges in the digital bitmap image;

transforming the detected edges into a plurality of vectors;

displaying, by a graphical user interface, the plurality of vectors as a vector image;

receiving, from a user using the graphical user interface, a selection of one or more vectors of the plurality of vectors;

determining a path order based on the received selection of one or more vectors;

storing, in a non-transitory, computer-readable medium, the determined path order as an ordered collection of vector descriptors;

receiving, from the user using the graphical user interface, a selection of one or more color filters; and filtering the digital bitmap image based on the received selection of one or more color filters.

2. The quilt-making machine of claim 1, wherein detecting edges in the digital bitmap image further comprises one or more of:

performing a gradient-based analysis of the digital bitmap image;

performing a second-order derivative analysis of the digital bitmap image;

performing canny edge detection to the digital bitmap image;

applying a machine learning algorithm to the digital bitmap image;

performing wavelet transformation to the digital bitmap image; and applying a fuzzy logic algorithm to the digital bitmap image.

3. The quilt-making machine of claim 1, the operations further comprising pre-processing the digital bitmap image to enhance edges in the digital bitmap image, wherein the pre-processing comprises one or more of:

converting the digital bitmap image from a color image to a grayscale image;

filtering the digital bitmap image by color;

applying a machine learning algorithm;

despeckling the digital bitmap image;

applying a Fourier transform;

applying Gaussian blur;

applying a bilateral filter;

applying a median filter;

applying histogram equalization;

applying unsharp masking;

performing color space conversion; and applying image thresholding.

4. The quilt-making machine of claim 1, the operations further comprising filtering the plurality of vectors to determine a subset of vectors, wherein the vector image is based on the determined subset of vectors.

5. The quilt-making machine of claim 1, the operations further comprising: identifying two or more adjacent vectors of the received selection of one or more vectors; and transforming the identified two or more adjacent vectors into a combined vector.

6. The quilt-making machine of claim 1, wherein determining a path order based on the received selection of one or more vectors comprises:

determining a first path-to-path order for the received selection of one or more vectors, wherein each of the vectors is representative of a machine movement path;

determining a first traversal distance between paths in the first path-to-path order;

determining a second path-to-path order, different from the first path-to-path order, for the received selection of one or more vectors;

determining a second traversal distance between paths in the second path-to-path order; and providing the first path-to-path order as the determined path order based on a determination that the first traversal distance is less than the second traversal distance; or providing the second path-to-path order as the determined path order based on a determination that the second traversal distance is less than the first traversal distance.

7. The quilt-making machine of claim 1, wherein the operations further comprise transforming the ordered collection of vector descriptors into an ordered collection of machine control instructions.

8. The quilt-making machine of claim 1, wherein the operations further comprise controlling operation of the computer-controlled sewing machine based on the ordered collection of vector descriptors.

9. A computer-implemented method for arranging a quilt, the method comprising:

receiving a digital bitmap image;

detecting edges in the digital bitmap image;

transforming the detected edges into a plurality of vectors;

displaying, by a graphical user interface, the plurality of vectors as a vector image;

receiving, from a user using the graphical user interface, a selection of one or more vectors of the plurality of vectors;

determining a path order based on the received selection of one or more vectors;

storing, in a non-transitory, computer-readable medium, the determined path order as an ordered collection of vector descriptors;

receiving, from the user using the graphical user interface, a selection of one or more color filters; and filtering the digital bitmap image based on the received selection of one or more color filters.

10. The computer-implemented method of claim 9, wherein detecting edges in the digital bitmap image further comprises one or more of:

performing a gradient-based analysis of the digital bitmap image;

performing a second-order derivative analysis of the digital bitmap image;

performing canny edge detection to the digital bitmap image;

applying a machine learning algorithm to the digital bitmap image;

performing wavelet transformation to the digital bitmap image; and applying a fuzzy logic algorithm to the digital bitmap image.

11. The computer-implemented method of claim 9, further comprising pre-processing the digital bitmap image to enhance edges in the digital bitmap image, wherein the pre-processing comprises one or more of:

converting the digital bitmap image from a color image to a grayscale image;

filtering the digital bitmap image by color;

applying a machine learning algorithm;

despeckling the digital bitmap image;

applying a Fourier transform;

applying Gaussian blur;

applying a bilateral filter;

applying a median filter;

applying histogram equalization;
applying unsharp masking;
performing color space conversion; and
applying image thresholding.

12. The computer-implemented method of claim 9, further comprising filtering the plurality of vectors to determine a subset of vectors, wherein the vector image is based on the determined subset of vectors.

13. The computer-implemented method of claim 9, further comprising;
identifying two or more adjacent vectors of the received selection of one or more vectors; and
transforming the identified two or more adjacent vectors into a combined vector.

14. The computer-implemented method of claim 9, wherein determining a path order based on the received selection of one or more vectors comprises:
determining a first path-to-path order for the received selection of one or more vectors, wherein each of the vectors is representative of a machine movement path;
determining a first traversal distance between paths in the first path-to-path order;
determining a second path-to-path order, different from the first path-to-path order, for the received selection of one or more vectors;
determining a second traversal distance between paths in the second path-to-path order; and
providing the first path-to-path order as the determined path order based on a determination that the first traversal distance is less than the second traversal distance; or
providing the second path-to-path order as the determined path order based on a determination that the second traversal distance is less than the first traversal distance.

15. The computer-implemented method of claim 9, further comprising transforming the ordered collection of vector descriptors into an ordered collection of machine control instructions.

16. The computer-implemented method of claim 9, further comprising controlling operation of a computer-controlled sewing machine based on the ordered collection of vector descriptors.

17. A quilt-making machine, comprising:
a computer-controlled sewing machine; and
a quilt arrangement engine comprising one or more processors; and
a non-transitory, computer-readable medium storing one or more machine-readable instructions that, when executed, cause the one or more processors to perform quilt arrangement engine operations, the quilt arrangement engine operations comprising:
receiving a digital bitmap image;
detecting edges in the digital bitmap image;
transforming the detected edges into a plurality of vectors;
displaying, by a graphical user interface, the plurality of vectors as a vector image;
receiving, from a user using the graphical user interface, a selection of one or more vectors of the plurality of vectors;
determining a path order, the determining comprising:
determining a first path-to-path order for the received selection of one or more vectors, wherein each of the vectors is representative of a machine movement path;
determining a first traversal distance between paths in the first path-to-path order;
determining a second path-to-path order, different from the first path-to-path order, for the received selection of one or more vectors;
determining a second traversal distance between paths in the second path-to-path order; and
providing the first path-to-path order as the determined path order based on a determination that the first traversal distance is less than the second traversal distance; or
providing the second path-to-path order as the determined path order based on a determination that the second traversal distance is less than the first traversal distance; and
storing, in a non-transitory, computer-readable medium, the determined path order as an ordered collection of vector descriptors.

18. The quilt-making machine of claim 17, wherein the operations further comprise controlling operation of the computer-controlled sewing machine based on the ordered collection of vector descriptors.

19. A computer-implemented method for arranging a quilt, the method comprising:
receiving a digital bitmap image;
detecting edges in the digital bitmap image;
transforming the detected edges into a plurality of vectors;
displaying, by a graphical user interface, the plurality of vectors as a vector image;
receiving, from a user using the graphical user interface, a selection of one or more vectors of the plurality of vectors;
determining a path order based on the received selection of one or more vectors, wherein determining a path order based on the received selection of one or more vectors comprises:
determining a first path-to-path order for the received selection of one or more vectors, wherein each of the vectors is representative of a machine movement path;
determining a first traversal distance between paths in the first path-to-path order;
determining a second path-to-path order, different from the first path-to-path order, for the received selection of one or more vectors;
determining a second traversal distance between paths in the second path-to-path order; and
providing the first path-to-path order as the determined path order based on a determination that the first traversal distance is less than the second traversal distance; or
providing the second path-to-path order as the determined path order based on a determination that the second traversal distance is less than the first traversal distance; and
storing, in a non-transitory, computer-readable medium, the determined path order as an ordered collection of vector descriptors.

20. The computer-implemented method of claim 19, wherein detecting edges in the digital bitmap image further comprises one or more of:
performing a gradient-based analysis of the digital bitmap image;
performing a second-order derivative analysis of the digital bitmap image;
performing canny edge detection to the digital bitmap image;
applying a machine learning algorithm to the digital bitmap image;

performing wavelet transformation to the digital bitmap image; and applying a fuzzy logic algorithm to the digital bitmap image.

21. The computer-implemented method of claim 19, further comprising controlling operation of a computer-controlled sewing machine based on the ordered collection of vector descriptors.

* * * * *